United States Patent [19]

Malinowski

[11] Patent Number: 4,995,077

[45] Date of Patent: Feb. 19, 1991

[54] CARD-LIKE DEVICE HAVING A MICROPROCESSOR AND SPEAKER FOR COMMUNICATING WITH A TELEPHONE LINE

[76] Inventor: Igor P. Malinowski, 1716 W. 265th St., Harbor City, Calif. 90710

[21] Appl. No.: 429,123

[22] Filed: Oct. 30, 1989

[51] Int. Cl.$^5$ .............................................. H04M 1/27
[52] U.S. Cl. ...................................... 379/355; 379/418
[58] Field of Search ............... 379/355, 356, 357, 354, 379/216, 418

[56] References Cited

U.S. PATENT DOCUMENTS

| | | | |
|---|---|---|---|
| 4,126,768 | 11/1978 | Grenzow | 379/357 |
| 4,817,135 | 3/1989 | Winebaum | 379/355 |
| 4,882,750 | 11/1989 | Henderson et al. | 379/355 |

FOREIGN PATENT DOCUMENTS 0073847  3/1989  Japan ................................. 379/357

*Primary Examiner*—James L. Dwyer
*Attorney, Agent, or Firm*—Irving Keschner

[57] ABSTRACT

A card-like device having a microprocessor and a speaker to communicate with telephone line, the device also including a single switch which when depressed by a user first activates the device and then causes a DTMF signal to be generated.

4 Claims, 2 Drawing Sheets

4,995,077

CARD-LIKE DEVICE HAVING A MICROPROCESSOR AND SPEAKER FOR COMMUNICATING WITH A TELEPHONE LINE

BACKGROUND OF THE INVENTION

1. Field of the Invention

The invention relates to an automatic telephone dialer embodied in a thin, compact, card-like device. The dialer contains memory to store telephone numbers or code numbers as well as circuitry to generate tones understood by the telephone network as dial signals.

2. Description of the Prior Art

Automatic dialers, devices which store one or more telephone numbers and when desired, upon a user's command, retrieve a number sequence and generate (or cause a telephone to generate) a set of audio signals corresponding to the desired telephone number, have been disclosed in the prior art. Typical of these prior art devices is the device disclosed in U S. Pat. No. 3,124,659 to Andregg, et al. which discloses an electromechanical device using a card having series of holes for encoding the telephone number thereon. Once the card is inserted into the device, electrical contacts are made through the card holes, an appropriate series of signals being generated as the holes pass through the series of spring like contacts. In this type of a device, the card serves merely as data storage and is not be itself capable of generating signals understood by the telephone line, but requires a special electromechanical reading device to be used This limits its use as an automatic dialer. U.S. Pat. No. 3,870,830 to Liu discloses an optical reader which uses a card with series of holes encoding the telephone number(s). When the user inserts the card into a slot of a telephone apparatus incorporating the optical reader, the reader decodes the series of holes in the card as a telephone number. In this type of a device the card serves merely to store data and is not by itself capable of generating signals understood by the telephone line. This limits its use as an automatic dialer because of modification of conventional telephones which would be required. U.S. Pat. No. 3,727,010 to Furjama et al. discloses a device which uses photocells as means of decoding the number information formed as holes on a card. U.S. Pat. No 4,672,661 to Clark et al. which discloses a card-like device having a strip of magnetic material with magnetically encoded number information. Upon insertion of the device into a modified telephone apparatus equipped with a magnetic reader, the telephone apparatus can retrieve encoded numbers on the magnetic strip number. In this type of a device the card serves again merely to store data and is not by itself capable of generating signals understood by the telephone line. Finally, U.S. Pat. No. 4,266,102 to Stanley et al. discloses an automatic dialer utilizing a device capable of reading a phone number of a business card and storing it in a memory, which later can be used for dialing. The device converts this information into a set of dial signals understandable by the telephone line.

Recently a variety of automatic telephone dialers have become commercially available. These dialers store one or more telephone numbers which are retrieved upon demand by the user, a set of DTMF (dual tone multi-frequency) tones through a speaker enclosed in the dialer being generated for a given number. (DTMF is a telephone standard for tone codes recognized as phone numbers dialed.) These dialers incorporate keyboard, speaker and an electrical circuit comprising a power supply and a chip containing multiple memories for storage of the telephone numbers and a DTMF tone generator. The chip memory is programmable from the keyboard by a sequence of keystrokes. The phone numbers are retrieved and dialed by pressing a sequence of keys on the keyboard.

Another dialer operating on a similar principle as the chip memory device noted above is also commercially available. This dialer contains an electronic watch with a built-in dialer. The memories and DTMF circuit are formed inside the chip together with circuitry for operation and control of the watch. This dialer contains memory sufficient for storage of multiple phone numbers, which can be programmed and retrieved from a keyboard enclosed with the dialer. This dialer, although small in size, is relatively expensive. The method of dialing a number in this dialer is complex and involves multiple keystrokes as well as scanning through menus on the liquid crystal display.

The prior art dialers set forth hereinabove, although satisfactory for most uses have serious disadvantages associated therewith. For example, the last devices noted with the exception of the watch/dialer are generally bulky and inconvenient to carry and, in addition, a series of buttons must be pressed to have the desired telephone number dialed. In the case of the watch dialer, observation of a liquid crystal display so that the correct menu is displayed is required; in addition, the watch/dialer automatic dialing sequence requires bringing the display side of the watch into close proximity to the receiver microphone, a relatively difficult task to accomplish if the watch/dialer is worn on the user's left wrist. In the case of devices disclosed in above mentioned patents, the dialer requires a reader device incorporated in the telephone apparatus to read data stored on an information bearing card, with the attendant increase in system cost and complexity.

SUMMARY OF THE PRESENT INVENTION

The present invention provides an automatic telephone dialer card device which is compact and lightweight and which includes a speaker and switch. Activation of the switch first causes power to be applied to the dialer and thereafter causes the DTMF tones to be generated. The power is automatically reduced after the pressure of the user s fingers is released from card surface, thus allowing the user to put the card away after successful call origination without discharging the power producing source. The compact size and light weight of the card dialer allows it to be kept in a user's shirt pocket. The length and width of the card dialer corresponds to the length and width of standard business cards, allowing a surface of the dialer to be overlaid with a layer of material upon which business card information, such as the name and number of the person or company distributing the card, can be printed, the dialer portion of the device having that phone number encoded therein. The card dialer is thus an effective business marketing tool in that the card dialed recipient is provided with a simple and effective way of calling the person whose name appears on the card.

BRIEF DESCRIPTION OF THE DRAWING

For a better understanding of the invention as well as other objects and further features thereof, reference is made to the following description which is to be read in conjunction with the accompanying drawing wherein.

DETAILED DESCRIPTION OF THE INVENTION

Figure 1:
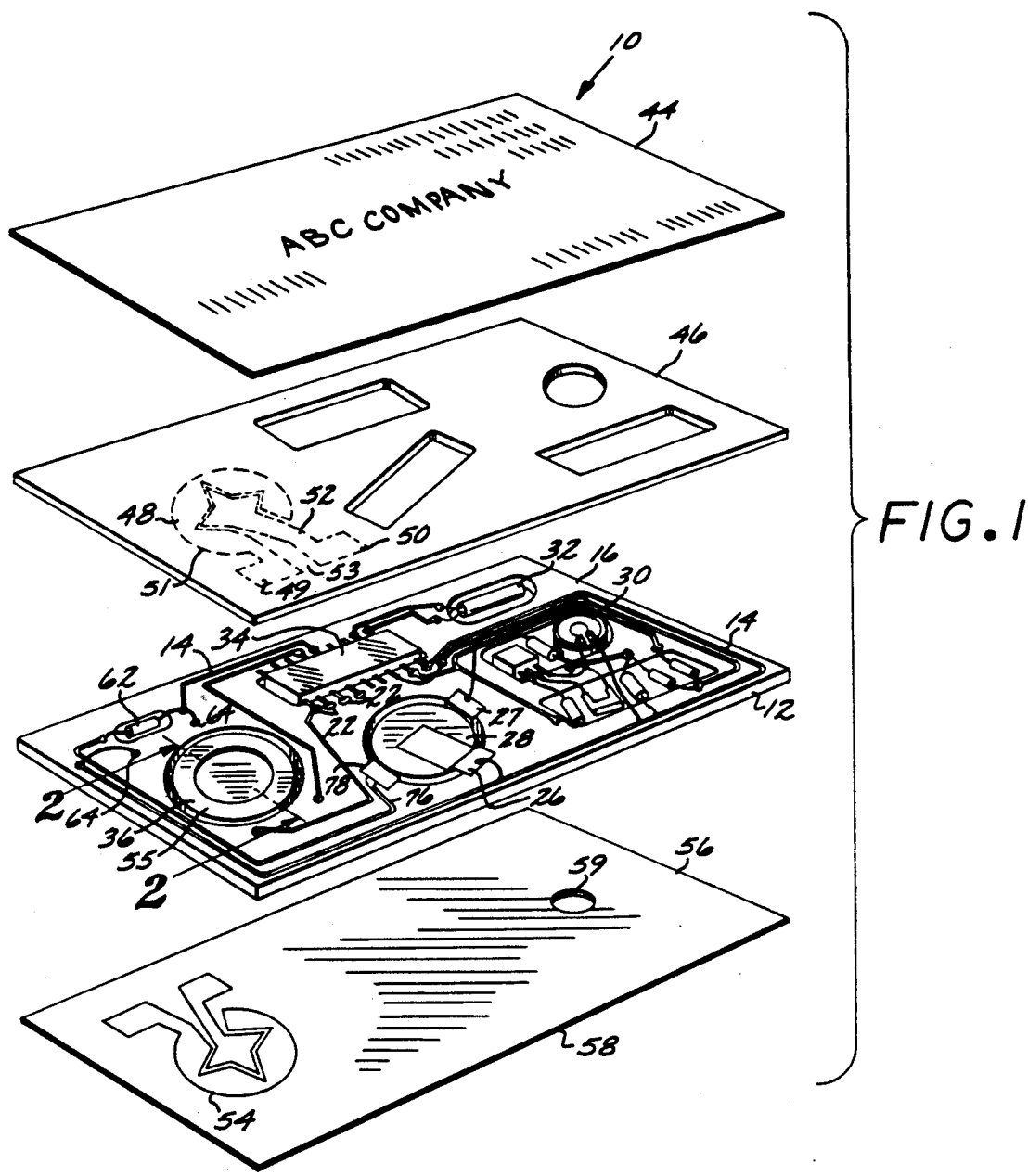
FIG. 1 is an exploded view of the card dialer device of the present invention.
Figure 2:
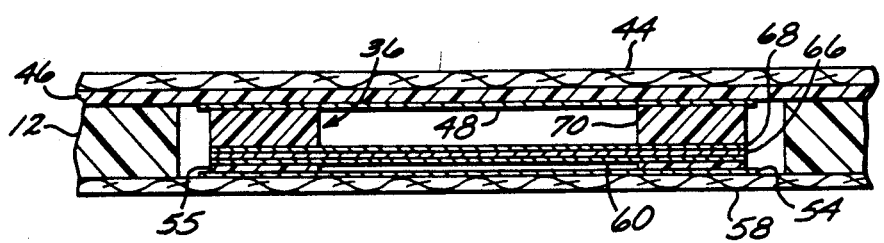
FIG. 2 is a cross-sectional view along line 2—2 of FIG. 1.

FIG. 1 is an exploded view of the card dialer lo of the present invention. Card dialer 10 comprises base member 12, a fiberglass printed circuit board having conductor traces 14 on surface 16. Base member 12 has a plurality of electronic and electromechanical components mounted thereto as described hereinafter. Thin metal brackets 26 and 27 mechanically support a power source 28, and conduct current between source 28 and member 12. Source 28 preferably comprises a thin lithium 3 volt cell battery and is mounted to member 12 through an opening formed therein. The function of source 28 is to provide electrical power to the electronic circuit portion of the card dialer formed on base 12. A thin, small electromagnetic acoustic transducer, or speaker, 30 is mounted on member 12 through an opening formed therein. Transducer 30 (preferably a TDK MSD 791701 transducer) has a frequency range wide enough to transmit DTMF tones and operates in conjunction with crystal 32, a small piezoelectric crystal oscillator (preferably a Seiko DS-MAT model crystal) providing a standard 3.579545 Mhz oscillation, for generation of DTMF tones. Crystal 32 is mounted to member 12 through an opening formed therein. Microprocessor, or dialer chip, 34 (preferably chip number KS5820, manufactured by Samsung Corporation) generates DTMF signals and has a redial capability. Dialer chip 34 is mounted to member 12 through an opening formed therein. The function of the dialer chip 34 is to provide the operation logic as well as to generate DTMF tones from the standard frequency provided by crystal 32. Dialer chip 34 is available as a preprogrammed chip, the only data to be entered into the chip being the telephone number to be called. This data is entered in a conventional manner with a keyboard in a manner described hereinafter A multiple function switch 36 functions to either connect (or disconnect) the supply voltage from battery 28 to a selected terminal of chip 34 (terminal 38 shown in FIG. 3) and to close (activate) the redial circuit by connecting selected terminals of chip 34 together (terminal 40 to terminal 42). Switch 36 is mounted to member 12 through an opening formed therein. A layer of paper 44 covers the components and the interconnections inside card dialer 10. A spacer 46, comprising a thin sheet of non-conductive material, provides an even surface for sheet 44 as well as to provide a flexible support for conducting pattern 48 (shown in phantom) formed on the bottom surface of spacer 46 which contacts member 12. Conducting pattern 48 functions as a set of two connections used to close the redial circuit. The two poles 49 and 50 of the pattern 48 are formed at the ends of layers 51 and 52, respectively, and are separated by a narrow gap 53. The poles 49 and 50 of conducting pattern 48 form an electrical connection when both of them are contacted with the round layer of conducting material 68 formed as part of multiple function switch 36 (see FIG. 2) when the switch is pressed by a user. The shape of the conducting pattern poles 49 and 50 are developed to provide the maximum probability that a good contact will be made when switch 36 is pressed by a user's fingers, thus making the card dialer 10 operational. Conducting pattern 54 is an analog of pattern 48 and is secured to the inward facing surface 56 of paper sheet 58. Pattern 54 serves to connect (and disconnect) terminal 38 of chip 34 from battery 28 by forming an electrical contact with conductive material layer 60 of switch 36. Paper sheet 44 has a surface texture allowing actual text (such as the information normally contained on a business card) to be printed thereon and constitutes the face of card dialer 10. Paper sheet 58 has an aperture 59 which functions as a sound pressure release for the transducer. The value of a resistor 62, mounted to member 12 through an opening formed in member 12, is selected to allow minimum leakage of the current while the supply voltage provided by battery 28 is connected to terminal 38 of chip 34. Components 64 are conducting metal rivets or pins allowing electric current to locally flow through the base 12 of card dialer 10. Contact surfaces 65 are connected to poles of the chip dialer 34 and are used in programming of the card dialer 10 with a desired number in a conventional manner FIG. 2 shows a cross-section of the card dialer 10 along line 2—2 of FIG. 1 illustrating multiple function switch 36 in more detail. Switch 36 comprises copper film layer 60 whose function is to connect the poles of conductor pattern 54 whereby the negative terminal of the battery is connected to terminal 38 of chip 34. Layer 66 of switch 36 comprises a thin plastic insulating material, such as Mylar, whose function is to separate conducting layers 60 and 68. Layer 68 comprises a layer of conducting metal (copper or other metal) film whose function is to connect the poles of front conductor pattern 48 to activate the redial circuit. Layers 60, 66 and 68 may be formed in convex shapes, thus requiring an additional force in deforming it and ensuring that the chip dialer is activated prior to the activation of the redial circuit. Layer 55, preferably a thin sheet of plastic material, such as Mylar, prevents accidental contact of the power circuit, but allows intentional contact when it is pressed by a user's finger. A layer of thick insulating foam 70, shaped like layer 55, prevents accidental closure of the redial circuit, but allows the redial circuit to be closed when intentionally depressed by a user's finger. The use of two insulating layers 55 and 70 of different thickness and hardness enables proper operation of the multiple function switch, the hook switch circuit connecting terminal 38 of chip 34 to ground before the redial circuit (tone generation) is closed. The thickness, softness and shape of layers 55 and 70 are selected to minimize the probability of first contact of the poles of conductor pattern 54 with layer of conducting material 60, thus closing the hook switch circuit prior to closing of the redial switch by forcing the poles of conducting pattern 54 into contact with conducting layer 60 prior to conducting layer 68 contacting conductor pattern 48. In operation, the user presses the finger against the face of the layer of paper 58. The conductor pattern 54, located beneath the layer of paper 58, under finger pressure makes contact with layer of conducting material 60 providing a connection between hook switch pin 38 (FIG. 3) of the dialer chip 34 and ground voltage Vss required to bring the dialer chip 34 into the active state (ready to generate dial tones). Only then does the insulating layer 70 yield to the pressure allowing for contact of poles of conducting pattern 48 with layer of conducting material 68 thus closing the circuit between row 4 pin 42 and column 4 pin 40 of the dialer circuit 34, (called redial circuit), a sequence of DTMF tones equivalent to the redialed number from the chip memory then being generated.

Dual function switch 36 comprises a thin Mylar layer 55 with a hole inside. This surface is normally in contact with conductive pattern 54 on the back of layer 58. Layers 60 and 68 are conducting layers, separated by insulating layer 66. Layer 70 is a thick (0.050") layer of insulating foam, the surface of which is normally in contact with conductive pattern 48.

When a user intends to dial the number, the user places the card on the telephone receiver with the back of the card (front of the speaker) or outside surface of layer 58 facing the microphone. Switch 36 is then depressed by pressing a spot on the back of the card 58 where the conductor pattern 54 is located.

Once the back of the card 58 has been deflected, conductor pattern 54, normally separated from conductor layer 60, is pushed beyond the thickness of layer 55 and makes contact with conductor layer 60 closing the poles of conductor pattern 54.

This connects the hook switch pin of dialer chip 34 to ground, dialer chip 34 then being brought to its operating state and being ready for redial.

Further depression of the back of the card 58 causes the insulating foam or layer 70 to decrease in thickness and eventually allow conductive layer 68 to come in contact with conductive pattern 48, closing the poles 49 and 50 thereof. This corresponds to connecting row pin 4 with column pin 4 of dialer chip 34 and is understood by the chip 34 as a command for redialing (generation of DTMF tones equivalent to the store phone number).

When the user releases the switch 36, the elasticity of a layer 58 and foam 70 pushes both conductive patterns 48 and 54 away from conductive layers 68 and 60, respectively. As a result, redial circuit (row 4 and column 4) is disconnected and the hook switch pin is connected back to +3V through resistor 62, which brings the dialer chip back into its low power consumption state.

FIG. 1 also shows a detail of the attachment and connection of battery support 26 to conductor trace 76 on base member 12 of card dialer 10. Conductor trace 76 is a trace of conducting metal on the surface 16 of base member 12. A conductive material 78, such as a piece of dual-sided conducting tape (such as Conductive Tape 9703 manufactured by 3M Company, Minneapolis, Minn.) is provided to both bond support 26 to pattern 76 while allowing current to flow therebetween. Solder, it should be noted, can be used in place of the conductive, adhesive tape.

Figure 3:
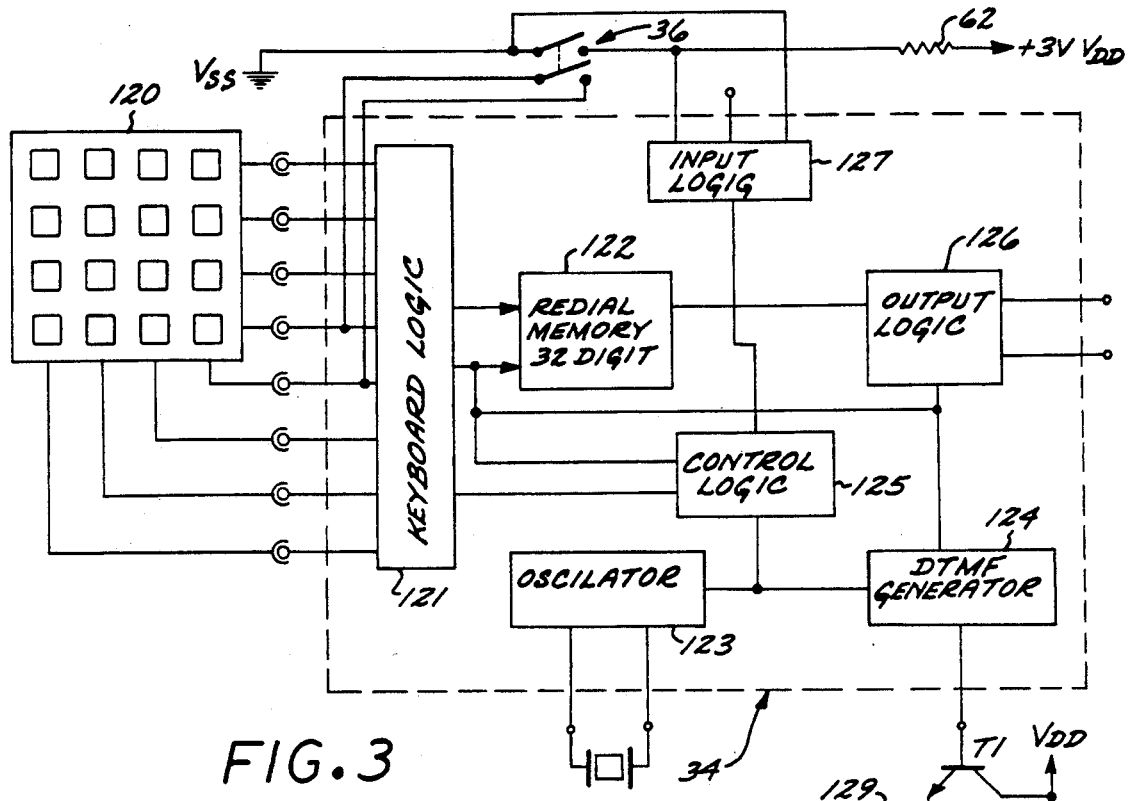
FIG. 3 is a schematic diagram of the acoustic transducer interface and signal amplifying circuit of the card dialer device of the present invention.

FIG. 3 is a schematic diagram of the acoustic transducer interface and signal amplifying circuit of card dialer 10. In operation, hook switch pin 38 of the dialer chip 34 is normally in the position illustrated and connected to positive supply voltage Vdd (battery 28) through resistor 62, whose resistance is high (500 k Ohm). In this state the dialer chip 34 is in the low power consumption state, thus reducing the power drain on battery 28. In this state, only the memory of the dialer chip 34 is supported, thus storing the number to be redialed. As the user depresses the multiple function switch 36, arm 36a is connected to terminal 36b of switch 36, a connection being made between the hook switch pin 38 of the dialer 34 and the ground voltage Vss, thus activating the dialer chip. Further pressing causes arm 36c to contact terminal 36d of switch 36, closing the circuit between the row 4 pin (R4) and column 4 pin (C4) of the dialer circuit 34, (called redial circuit) which causes the generation of a sequence of DTMF tones on the tone output (T/0) pin of the dialer chip 34. The frequencies of the signal are derived from the crystal oscillator 32 connected between the OCS IN pin and the OSC OUT pin of the dialer chip 34 Resistor 80, coupled across tone output (T/0) pin of the dialer chip 34, has a relatively high value (100 k Ohm), thus clamping the tone output from the dialer chip to ground Resistors 82, 84, and 86 establish the operating point of transistor T1. Resistor 88 provides a ground path for the emitter follower and capacitor 90 shapes the waveform coupled to speaker 30. Speaker 30 is connected between the collector electrode of transistor T1 and the supply voltage Vdd.

Figure 4:
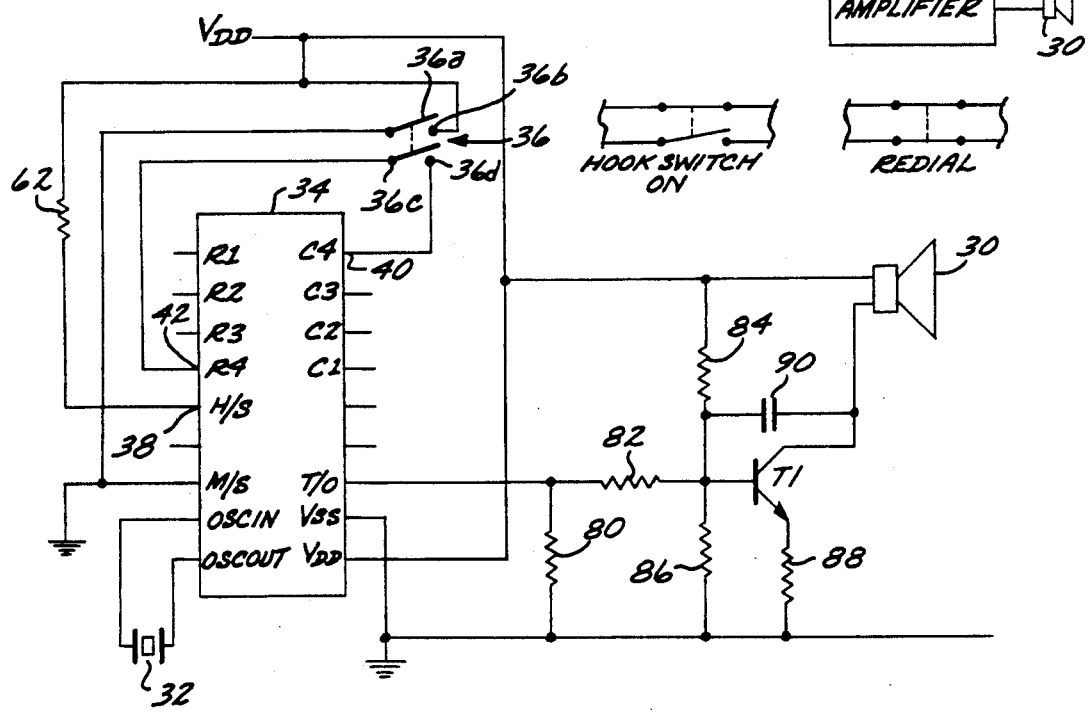
FIG. 4 is a block diagram of the card dialer device of the present invention.

The components and typical values thereof which can utilized in the schematic circuit shown in FIG. 4 follow:

| | |
|---|---|
| Resistor 82 = 2 K Ohms | Capacitor 90 = 10nF |
| Resistor 84 = 88 K Ohms | T1 = (MPS 3706 (monolithic) |
| Resistor 86 = 6 K Ohms | Vdd = 3V |
| Resistor 88 = 10 K Ohms | Dialer Chip 34 (KS 58A20, Samsung) |
| Resistor 80 = 100 K Ohms | Oscillator 01 (Seiko DS-MAT-357, 3.579545 MHz) |
| Resistor 62 = 500 K Ohms | Speaker 30 (R >100 ohms, MSD 791701, TDK) |

The sequence of DTMF tones is received by the microphone in the telephone handle and recognized by the telephone line as a dialed phone number. This allows the card dialer user to connect with the desired number. After having obtained the desired result the user puts away the card dialer, thus releasing the pressure form the multiple function switch. This opens both the hook switch and redial circuits, thus connecting pin 38 to Vdd which causes the dialer chip to change to the low energy state thus prolonging the life of the battery.

Connection of the card pins for programming purposes is done in a special fixture (not shown) equipped with set of contact pins for connecting contact areas 22 of the dialer card, and a keyboard for programming, the number. After programing the card dialer is overlaid with a sheet of paper 44, such as a business card, carrying written information.

FIG. 4 shows the block diagram of card dialer chip 34. Keyboard 120 is provided to program the dialer chip memory. The closure of a circuit between selected row and columns (reduction of resistance between given row and column pin of the dialer circuit) is translated in keyboard interface 121 to signals understood as digits of a telephone number to be stored in redial memory 122. Oscillator control 123 interfaces with external crystal oscillator 32. DTMF generator 124 generates DTMF tones from frequencies provide by the oscillator 123 Control logic 125 is responsible for generation of correct sequence of tones from redial memory 122. Output logic 126 is used for pulse dialing, a feature not used in the present invention since the dialer chip provides output in the tone dial mode. Input logic 127 determines when the chip card device 10 is activated and determines the mode of the chip output. The output of generator 124 is coupled to speaker 30 through transistor T1 and amplifier 129 comprising transistor 71, resistors 80, 82, 84, 86 and 88 and capacitor 90.

The telephone number is programmed into the card dialer device 10 after activation of dialer chip 34 (hook switch pin 38 connected with Vss) by sequential circuit closing between appropriate column and row pins of the dialer chip 34 and then disconnecting the hook switch pin 38 from Vss (voltage on hook switch pin 38 goes up to Vdd) as noted hereinabove. Connecting a certain row pin with a column pin results in the dialer circuit understanding a digit being programmed into memory. Connection of row 4 with column 4 is reserved to indicate that redial is to be initiated.

Typical dimensions of the card dialer using the multiple function switch 36 shown in FIG. 1 are 3.5" (length) by 2" (width) by 0.065" (thickness).

The steps utilized to assemble card dialer 10 are as follows:

(1) Conductive traces 14 are etched on surface 16 of base member 12;
(2) Metal pin rivets 64 are inserted into base member 12;
(3) The electronic components are soldered to pads of the conductive traces 14, such as speaker 30, dialer chip 34, oscillator 32, etc.;
(4) Battery 28 is secured to thin metal brackets 27 and 28 by conductive tape;
(5) Metal brackets 27 and 28 are attached to its pads on conductive pattern by conductive tape;
(6) Previously assembled multiple function switch 36 is inserted into opening 22;
(7) Conductive pattern 48 is formed on spacer 46 in a conventional manner;
(8) Spacer 46 is attached to surface 16 of base 12 and pads on conductive pattern 48 with conductive tape;
(9) Conductive pattern 54 is attached to the back of paper sheet 56 by a conductive tape so that pattern 54 is in contact with pins 64;
(10) Paper layer 44 is attached to spacer 46;
(11) The desired phone number is programmed into dialer chip 34 by lowering a set of contact pins of the programming fixture onto pads of the conductive pattern, corresponding to row and column pins of the dialer chip in a conventional manner as well as to the pad corresponding to the hook switch and to a pad connected to ground (Vss). As noted previously, the programming device first closes the circuit between ground (Vss) and the hook switch pin to bring dialer chip 34 into the operating state. Subsequently, connections are made between appropriate row and column pins in the programming fixture. The keyboard 120 shown in FIG. 4 allows numbers to be translated into proper connections between column and row pins of dialer chip 34; and
(12) A business card is attached to the top surface of spacer 46.

Although speaker 30 is illustrated as comprising a mechanical acoustic transducer type device, other types of speakers may be used. For example, a thin speaker can be fabricated from a piezoelectric film, such as that commercially available under the trademark KYNAR a product of Pennwalt Corporation, Philadelphia, Penna. The speaker would operate under the principle that piezoelectric foil generates desired acoustical tones through dimensional changes as voltage is applied across electrodes formed on opposite sides of the foil.

Similarly, switch 36 can also be fabricated from a sheet of Kynar piezoelectric film. When pressure is applied to the switch, its piezoelectric property causes an electrical signal to be generated which, via designed circuitry, initially activates the redial circuit. The signal is delayed a predetermined time period and then causes a sequence of DTMF signals, understood by the telephone line as a dialed number, to be generated.

Additionally, a dialer chip in a die form, mounted directly to base 12, with connections wirebounded to traces 14, can be used. Also, different batteries can be used, such as the 0.5 mm thick lithium batteries commercially available.

If the Kynar piezoelectric film is utilized as the switch and speaker components, the card dialer thickness can be reduced to 0.030".

The present invention thus provides a compact card dialer device which has self-contained speaker and DTMF communication components thus allowing automatic telephone dialing without the necessity of modifying existing telephones to read the encoded numbers as is required on currently available automatic dialers. In addition, the small size of the card dialer device enables it to be adapted for use as business cards, the recipient having the ability to quickly and easily dial the phone number of the service provider named on the paper (or cardboard) layer applied to the surface of the device.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material tot he teaching of the invention without departing from its essential teachings.

What is claimed is:

1. A telephone dialer card device comprising a microprocessor including a memory device for storing a signal corresponding to desired telephone number, a power source, said microprocessor having the capability of generating an electrical signal corresponding to said desired telephone number when activated, transducer means for converting the electrical signal to an acoustic signal for coupling to a telephone line, and switch means mounted on said card for supplying power from said power source to said microprocessor, said switch means being a first operative position when a user applies a firs amount of pressure thereto, said switch means being in a second operative position when a user applies a second amount of pressure thereto.

2. The device of claim 1 wherein said first amount of user pressure on the switch means activates said device and said second amount of switch pressure causes said acoustic signal to be generated.

3. The device of claim 2 further including resistor means coupled between said power source and said microprocessor whereby said microprocessor is in an initial lower power made prior to user pressure being applied to said switch means.

4. The device of claim 3 wherein said microprocessor returns to said initial lower power mode when user pressure is removed from said switch means.

* * * * *

UNITED STATES PATENT AND TRADEMARK OFFICE
CERTIFICATE OF CORRECTION

PATENT NO.   :   4,995,077
DATED        :   February 19, 1991
INVENTOR(S)  :   Igor P. Malinowski It is certified that error appears in the above-identified patent and that said Letters Patent is hereby corrected as shown below:

Column 8, line 49, after "being", the term --in-- should be inserted; line 50, the term "firs" should read --first--.

Signed and Sealed this

Seventeenth Day of November, 1992

Attest:

DOUGLAS B. COMER

*Attesting Officer*    Acting Commissioner of Patents and Trademarks